(12) United States Patent
Lo Giudice et al.

(10) Patent No.: US 7,160,938 B1
(45) Date of Patent: Jan. 9, 2007

(54) ADDITIVE COMPOSITION FOR ORGANIC POLYMERS AND ITS USE

(75) Inventors: Franco Lo Giudice, Genoa (IT); Imelda Lo Giudice, Chiavari (IT)

(73) Assignee: Polichem S.r.l., Genoa (IT)

( * ) Notice: Subject to any disclaimer, the term of this patent is extended or adjusted under 35 U.S.C. 154(b) by 1138 days.

(21) Appl. No.: 09/685,601

(22) Filed: Oct. 11, 2000

(51) Int. Cl.
*C08K 5/5415* (2006.01)
*C08K 5/01* (2006.01)

(52) U.S. Cl. .................. 524/268; 524/474; 524/490
(58) Field of Classification Search ........ 524/261–268, 524/490
See application file for complete search history.

(56) References Cited

U.S. PATENT DOCUMENTS

| | | | |
|---|---|---|---|
| 4,762,878 A * | 8/1988 | Takeda et al. | 524/490 |
| 4,938,910 A * | 7/1990 | Abe et al. | 264/236 |
| 5,416,151 A * | 5/1995 | Tanaka | 524/484 |
| 6,706,797 B1* | 3/2004 | Ebert et al. | 524/490 |

FOREIGN PATENT DOCUMENTS

| | | |
|---|---|---|
| DE | 3841609 A1 * | 6/1989 |
| EP | 0 290 230 | 11/1988 |
| JP | 04 236256 | 8/1992 |
| WO | WO 01/04199 | 1/2001 |

OTHER PUBLICATIONS

Guenter Karjoth, Database Chemabs 'Online! Chemical Abstracts Service, pp. 109-114, AN 113:153624, XP000216006, "Stepwise Specification of a Sliding-Window Protocol by Means of Process Algebra" 61998; and.

Gareth J. Price, et al., Polymer, 1 page, "Prediction of Compatibility in Polymer-Plasticizer Systems", 1990, (Abstract only).

* cited by examiner

*Primary Examiner*—Marc S. Zimmer
(74) *Attorney, Agent, or Firm*—Oblon, Spivak, McClelland, Maier & Neustadt, P.C.

(57) ABSTRACT

A lubricating/detaching/fluidifying additive composition for organic polymers is described, comprising a saturated hydrocarbon having from 25 to 35 carbon atoms with at least three side substituents consisting of a methyl group, combined with at least one polysiloxane polymer having a molecular weight higher than 500,000. The use of this composition or single hydrocarbon component as lubricating/detaching/fluidifying additive for organic polymers, is also described, together with a polymeric composition containing additives, comprising an organic polymer and the additive composition.

The use according to the present invention is particularly advantageous as it is universal (the same additive for all organic polymers, regardless of their formulation); it allows the use of high viscosity/high M.W. polymers (suitable for extrusion), also in injection moulding, and enables the additive to be applied externally to the polymer.

22 Claims, No Drawings

ADDITIVE COMPOSITION FOR ORGANIC POLYMERS AND ITS USE

The present invention relates to an additive composition for organic polymers, the use of this composition or of the single hydrocarbon component, as lubricating/detaching/fluidifying additive for organic polymers, and the polymeric compositions to which it is added.

The problem of reducing friction and easy detachment from the mould is well known with respect to organic polymers different from PVC.

The known art has solved this problem by adding, among others, lubricating/detaching agents (oils, waxes, esters, etc.) to these polymers, which act as so-called "external" lubricants, in the sense that, owing to their limited compatibility with the polymers, migrate to the interface between the polymer and metallic parts of the transforming machine, thus favouring detachment from the mould and reducing friction.

The use as polymer additives of process lubricants/mould detaching agents, such as those previously described, having an "external" lubricating effect, requires however the application of specific conditions and dosage parameters, specific transformation thermal profiles, a particular geometry of the transforming machines, precise transformation times, together with compatibility with the polymers and relative formulation components and, above all, the incorporation of said additives which act as "external" lubricants by means of compounding (which is a general process). In fact, if these conditions are not respected, the following problems arise:

- over-lubrication phenomena, with deposits on the dies and moulds;
- leakage from the end-product over a period of time with the formation of stains or, in the case of containers, migration to the products contained therein;
- reduction in the thermal stability, in particular in polymers which are transformed at high temperatures;
- reduction in the transparency, in particular in PC, PMMA, styrene homopolymers and copolymers, polyamide copolymers, etc.;
- reduction in the mechanical properties (IZOD, tensile strength, etc.), in particular at low temperatures, in the thermal properties (VICAT, HDT), welding, surface treatment, coupling, painting, metallization, flame-resistance, etc.
- secondary reactions with the polymers or formulation components, which may cause hydrolysis, lipolysis, variations in the surface tensions, etc.;
- difficulty in transforming "hard" polymers due to the intrinsic viscosity or the presence of fillers, loadings, etc.

The present invention therefore proposes to overcome the drawbacks present in the known art.

In particular, an object of the present invention relates to the use of a lubricating/detaching/fluidifying additive product or composition for organic polymers, comprising a saturated hydrocarbon having from 25 to 35 carbon atoms, with at least three side substituents consisting of a methyl group, optionally combined with at least one polysiloxane polymer having a molecular weight higher than 500,000.

In this application, references to the molecular weight of the polysiloxane polymers are intended to be references to the number average molecular weight, which is the ordinary average molecular weight usually meant, Schmidt and Marlies, *Principles of High-Polymer Theory and Practice*, 1948, pages 8 and 238.

A further object of the present invention relates to a lubricating/detaching/fluidifying additive composition for organic polymers, comprising a saturated hydrocarbon having from 25 to 35 carbon atoms, with at least three side substituents consisting of a methyl group, optionally combined with at least one polysiloxane polymer having a molecular weight higher than 500,000.

The present invention also relates to a polymeric composition containing additives, comprising an organic polymer and the additive product or composition.

In particular, the present invention relates to the use of a lubricating/detaching/fluidifying additive product for organic polymers, selected from the following compounds:

2,6,10,15,19,23-hexamethyltetracosane and its isomers having hexamethyltetracosane as the basic structure.

This product is preferably 2,6,10,15,19,23-hexamethyltetracosane.

The present invention relates to the use of the additive composition preferably for polymers such as all extrusion and moulding polycarbonates, polyamides, copolyamides and high strength polyamide compositions, transparent ABS, styrene copolymers, methacrylates.

In particular, the additive product or composition, according to the present invention, is present in a quantity ranging from 0.01% to 80% by weight with respect to the total weight of the organic polymer containing the additive.

The hydrocarbon component is preferably present in a quantity ranging from 0.01% to 50% by weight with respect to the total weight of the organic polymer containing the additive and the polysiloxane polymer is present in a quantity ranging from 0.05% to 30% by weight with respect to the weight of the organic polymer containing the additive.

The hydrocarbon and polysiloxane polymer are present in any ratio.

The additive product or composition is preferably present in a quantity ranging from 0.01% to 10% by weight with respect to the total weight of the organic polymer containing the additive, when the polymer is a thermoplastic.

The additive compositions used according to the present invention can be formulated in any form: paste, liquid, supported on absorbing products or matrix resins (MasterBatches) etc.

They can also be formulated with any additive for polymers, pigment, dye, modifying agent, loading, filler, solvent, diluent, catalyst, etc. which are normally used with polymers, comprising liquid or gaseous polymerization systems.

The polymeric composition containing additives therefore comprises the organic polymer and the additive product or composition and optionally additives, modifying agents, loadings, fillers, solvents, diluents, etc.

In particular, the additive product or composition adopted according to the present invention can be used as a plasticizer in rubbers, in TR (thermoplastic rubbers) instead of naphthenic and/or paraffinic oils. It has a much higher compatibility with respect to these additives.

The polymeric composition containing additives preferably comprises, as organic polymers, thermoplastic resins, natural and synthetic elastomers, thermoplastic elastomers, thermosetting resins.

The polymeric composition containing additives even more preferably comprises, as organic polymers, copolyesters (PET, PBT, PEN) and their copolymers, polyesters, polycarbonates, polyurethanes, polyacetals, polyamides, copolyamides, polyphenyleneoxides, polyimides, polyamide-imides, polysulfones, polyketones, high-strength polyamide compositions, transparent ABS, styrene resins, methacrylates, polyetherimides.

These organic polymers can be used as such, or mixed with each other, copolymerized, formulated with other polymers, formulated and/or modified with further additional substances, known and normally used in the field. Examples of these additional substances are pigments, filling and reinforcing substances (such as natural fibers, glass fibers, carbon fibers, aramidic fibers, etc.), flame-retardant substances, shock-resistance agents (such as SBR, SBS, EPS, EPR, SEBS, EMP, EPDM), anti-UV substances and anti-oxidants, waxes, esters and oils.

The polymeric composition containing the additive composition according to the present invention, can be processed using the classical transformation technologies such as extrusion, calendering, blowing, injection moulding, coating, casting, impregnation, rotational moulding, fiber spinning, non-woven fabrics (of the spunbonded type).

The polymeric composition containing the additive according to the present invention, can also be used for extruded PA, acrylic, PVDC and PVA (for use at low temperatures) films or perfectly transparent PMMA plates, without the formation of plate-out on the dies, or on the calender or on the calibrator, etc.

The use, according to the present invention, of the hydrocarbon product as additive, allows the production of transparent polymers (copolyamides, styrene copolymers, polycarbonates, polymethacrylates, transparent ABS, etc.) with excellent process lubrication and mould detachment, unaltered optical and mechanical characteristics also at low temperatures. In this particular case, the additive composition does not comprise the presence of siloxane polymers in order to prevent the transparency from being modified. The additive comprising the siloxane polymer can be used for the same polymers, when not transparent.

The use of this additive product or composition furthermore, allows the production of high molecular weight polymers, suitable for extrusion (polyamides, polycarbonates, polyolefins), which can be easily injection moulded.

The polymeric composition containing the additive product or composition according to the present invention, also has the following characteristics: dyed and/or loaded and/or filled polymers can be obtained, which can be processed with lower thermal profiles, with an improved processability, better dispersion of the pigments, loadings, fillers, flame-retardant agents and less wear of the transformation plants. As a result polymeric compositions with high percentages of loadings and/or fillers, and/or flame-retardant agents can be obtained, of any type, to be used as such or as Master Batches.

In addition, in the case of polymers sensitive to temperature (such as PVA) or temperature oscillations (such as TPU), the polymeric composition containing the additive according to the present invention can be more easily processed.

In the case of spinning polymers, the polymeric composition containing the additive has homogeneous and constant mechanical and stability characteristics during the whole production.

In addition, the polymeric composition containing the additive product or composition according to the present invention, can be easily detached from the mould when the polymer is a thermosetting product for impregnation and/or casting.

In the case of polymeric compositions containing additives, where the polymer consists of expanded polyurethanes, homogeneous cells are obtained. These compositions moreover can be used as polymeric compositions for paints in powder form, which are easily extrudable, perfectly dispersible and with leveled end-surfaces, or as easily extrudable polymeric compositions for hot melts. Polymeric compositions containing additives are also obtained, wherein the polymer is an epoxy resin and zinc or copper, or other easily processable metals, in powder form.

The polymeric compositions containing additives according to the present invention, can be polymeric compositions based on thermoplastic rubbers (SBS, SEBS, etc.), oil-extended by the addition according to the present invention or with the use of the product or composition according to the present invention, or with cuts thereof with paraffinic or naphthenic oils, with extremely reduced blooming phenomena and stains.

The polymeric composition containing additives according to the present invention, can be a polymeric composition for the extrusion/calendering of plates and films (PA, PVC, PVDC, PE, PP, acrylic, PMMA, etc.) for use at room temperature or low temperatures (for example for frozen food containers) with an improved flexibility. In addition said polymeric composition according to the present invention can be a polymeric composition based on vinylic plastisols, expanded PU, rubbers for use in the food industry (for example in cap inlay), or a polymeric composition for self-lubricating end-products, or for the production of aqueous emulsions to be used as detaching agents.

Finally, the additive is applied externally to said polymeric compositions, i.e. before moulding, also at room temperature and with slow mixers, without the necessity of incorporating the additive via extrusion/compounding. The polymer is thus less stressed and does not lose its mechanical and optical properties.

In particular, the additives can be incorporated into the polymers described and listed above in any preparation and processing step, also including the start-up and/or operating phase.

One of the advantages of the additive product or composition according to the present invention is that it has universal use, practically for all polymers and relative formulations, that it is effective even at very low dosages and is suitable for transparent polymers.

The composition or product used as additive according to the present invention also has the contemporaneous functions of detaching agent from the mould, dispersing agent for pigments, additives and loadings, apparent viscosity reducer (in the molten state), "external" lubricant (reduction in the friction between polymers and metallic parts), and "internal" lubricant (reduction in the interface friction between polymer/polymer, polymer/loadings, polymer/filler, etc.), viscosity reducer for vinylic plastisols, impermeabilizing agent, also with respect to bacteria and mildew.

They can also be used by external addition, i.e. without the necessity of incorporation via extrusion or compounding, and therefore have enormous technical and economic advantages, as the compatibility is so high that the polymers containing additives, when left to rest for a certain period of time, completely absorb these additives, remaining dry and free-flowing.

They can also be used as humectants for binding powders to polymer granules, as bases for pigmenting pastes for organic polymers, etc.

The additive product or composition can additionally be used in high-strength polymers also operating at low temperatures or flexible polymers also at extremely low temperatures, also destined for the food, cosmetic, pharmaceutical industries, etc. where absence of migration, odour, flavour, etc. are required.

The use of the additive product or composition according to the present invention as a base for pigmenting pastes for organic polymers or mould detaching formulates for rubbers or thermosetting resins, allows the production of pastes or formulates which are of universal use, are easily dispersible in all polymers, pastes or formulates without particular interference with the rheology of the polymers containing additives, and extremely fluid, even at low temperatures.

The characteristics and advantages of the product or composition used according to the present invention can be better understood from the detailed and illustrative description provided below.

EXAMPLES

The polymers in granular form were mixed at room temperature with the product or composition used as additive according to the present invention, and then left to rest for 48 hours.

A part of these was subsequently moulded as such, on an injection press.

Another part was extruded on a Union single-screw extruder (diameter 28 mm, length 20 diameters, compression ratio 1:4, screw rate set at 30 rpm), using thermal profiles suitable for the polymer used, and subsequently moulded.

The same polymers in granular form were mixed with other commercial additives having the same functions as the products or compositions used as additives according to the present invention, and were then extruded and moulded. The results were compared with those obtained above.

The "spaghetti" obtained were cut into granules to enable them to be injection moulded.

In the case of the additive according to the present invention, no difference was observed between the polymers with external addition followed by moulding and the polymers to which the additive was applied in dispersed form by drawing followed by moulding.

The Melt Flow Index (MFI) parameter was also measured for a fraction of the granules according to the regulation ASTM D 1238.

Example 1

Film-grade PEHD (MFI=5), containing 0.08% of the additive 2,6,10,15,19,23-hexamethyltetracosane.

The extrusion proved to be more regular than the same PEHD without additive, the flow-rates were increased by 12% and the surface defects due to infused products (fisheyes).

Example 2

| Polymer | 2, 6, 10, 15, 19, 23 hexamethyltetracosane additive % | MFI | Mouldability | Notes |
|---|---|---|---|---|
| PEHD | 0 | 2 | difficult | |
| PEED | 0.1 | 4.2 | very easy | Moulds like a product with MFI = 10 |

| Polymer | 2, 6, 10, 15, 19, 23 hexamethyltetracosane additive % | MFI | Mouldability | Notes |
|---|---|---|---|---|
| PEHD | 0.1 + 0.1 polysiloxane MW > 500,000 | 4.4 | even easier | Moulds at T 10° C. lower |

Example 3

A blue phthalocyanine pigment in powder form was added to film-grade PELD (with MFI equal to 5). The end-product had spots and trimmings.

The same PELD to which 0.1% of 2,6,10,15,19, 23-hexamethyltetracosane was added externally, had none of the above defects.

Example 4

| Polymer | 2, 6, 10, 15, 19, 23 hexamethyltetracosane additive % | Mouldability |
|---|---|---|
| PA-6 (η = 2.7) non-nucleated | 0 | long cycles (over 20") sticks to the mould does not complete the shape |
| PA6 (η = 2.7) non-nucleated | 0.1 | fast cycles (about 5") detaches well from the mould completes the shape, as if more fluid, but MFI is the same |

The same non-nucleated polymer, containing 0.3% of metal stearates, has detachment difficulties.

Example 5

| Polymer | 2, 6, 10, 15, 19, 23 hexamethyltetracosane additive % | Mouldability |
|---|---|---|
| Transparent copolyamide | 0 | long cycles (over 15") sticks to the mould does not have dimensional stability |
| Transparent copolyamide | 0.1 | fast cycles (about 5") detaches well from the mould maintains dimensional stability transparency is unchanged |

The same polymer, containing 0.2% of amide waxes, detaches reasonably well but loses transparency.

Example 6

| Polymer | 2, 6, 10, 15, 19, 23 hexamethyltetracosane additive % | Mouldability |
|---|---|---|
| PMMA copolymer MFI = 2 | 0 | difficult loading into the screw high friction which causes degradation, yellowing and spots |

-continued

| Polymer | 2, 6, 10, 15, 19, 23 hexamethyltetracosane additive % | Mouldability |
|---|---|---|
| PMMA copolymer MFI = 2 | 0.1 | fast cycles easy loading into the screw transparency is unchanged |

Example 7

| Polymer | 2, 6, 10, 15, 19, 23 hexamethyltetracosane additive % | Mouldability |
|---|---|---|
| PET/f.g. (30%) (PET with i.v. = 0.78) | 0 | long cycles (over 40") sticks to the mould |
| PET/f.g. (30%) (PET with i.v. = 0.78) | 0.2 | reduced cycles (about 25") detaches well from the mould |
| PET/f.g. (30%) (PET with i.v. = 0.78) | 0.2 + 0.2 of polysiloxane MW > 500,000 | cycles reduced to 15" detaches well from the mould high dimensional stability |

Example 8

| Polymer | 2, 6, 10, 15, 19, 23 hexamethyltetracosane additive % | Behaviour during extrusion, end-characteristics |
|---|---|---|
| PET i.v. = 0.64 continuous filament Extrusion | 0 | Standard behaviour |
| PET i.v. = 0.64 continuous filament extrusion | 0.5 | no breakage reduction in head pressure 3% increase in tenacity |
| PET i.v. = 0.64 continuous filament extrusion | 1 | no breakage reduction in head pressure 5% increase in tenacity |
| PET i.v. = 0.64 continuous filament extrusion | 2.8 | no breakage reduction in head pressure 8% increase in tenacity |

This test demonstrates the compatibility of the additives according to the present invention even with high dosages, in an extremely critical application with respect to both the type of end-product and high temperatures used.

Example 9

A product is obtained starting from a polymer consisting of a PET staple extrusion (i.v.=0.72) obtained from crushed recycled bottles, containing 0.1% of 2,6,10,15,19,23-hexamethyltetracosane and 0.1% of polysiloxane having a molecular weight higher than 500,000, in which problems relating to extruder oscillations, cavitations, pulsations responsible for continual thread breakage, were completely solved. At the same time there is a considerable reduction in the pressure at the head (for example from 54 to 48 bars).

Example 10

| Polymer | 2, 6, 10, 15, 19, 23 hexamethyltetracosane additive % | Mouldability |
|---|---|---|
| Styrene copolymer (transparent ABS) | 0 | medium cycles sticks to the mould limited dimensional stability |
| Styrene copolymer (transparent ABS) | 0.05 | fast cycles detaches easily from mould very high dimensional stability transparency unchanged |

Example 11

| Polymer | 2, 6, 10, 15, 19, 23 hexamethyltetracosane additive % | Mouldability and transparency |
|---|---|---|
| Moulding PC | 0 | difficult detachment from the mould yellowing due to shear |
| Moulding PC | 0.1 | fast cycle easy detachment from the mould no migration on the mould unchanged transparency unchanged mechanical properties |
| Moulding PC | 0.5 | fast cycle easy detachment from the mould no migration on the mould unchanged transparency unchanged mechanical properties |
| Moulding PC | 1 | fast cycle easy detachment from the mould no migration on the mould unchanged transparency unchanged mechanical properties |

The same polymer, containing 0.1% of silicon oil ($\eta$=30,000), or 0.2% of cetyl-stearyl-palmitate, or Behenyl-behenate, or pentaerythritol tetrastearate, or a secondary amide, has a slightly longer cycle and a drop in mechanical properties and transparency (ranging from 3 to 5%)

Example 12

| Polymer | 2, 6, 10, 15, 19, 23 hexamethyltetracosane additive % | Mouldability and transparency |
|---|---|---|
| Extrusion PC | 0 | does not fill mould high yellowing |
| Extrusion PC | 0.1 | fills mould stable transparency |

As is evident from the above description, the use of these "processing-aid" products or compositions proves to be particularly advantageous, firstly because it allows the partial or total substitution of groups of additives having a limited compatibility, and also because these "processing-aid" products or compositions have a universal use. They can also be used for high viscosity/high MW polymers (suitable for extrusion) also in injection moulding. Finally, they can be added "separately" without requiring extrusion and compounding.

The invention claimed is:

1. A lubricating/detaching/fluidifying additive composition for organic polymers, comprising an additive product which is a saturated hydrocarbon having from 25 to 35 carbon atoms with at least three side substituents each consisting of a methyl group, combined with at least one polysiloxane polymer having a number average molecular weight higher than 500,000.

2. The additive composition according to claim 1, characterized in that the hydrocarbon is at least one substance selected from the group consisting of 2,6,10,15,19,23-hexamethyltetracosane and its isomers having hexamethyltetracosane as basic structure.

3. The additive composition according to claim 1, characterized in that the hydrocarbon is 2, 6, 10, 15, 19,23-hexamethyltetracosane.

4. A composition comprising an organic polymer and the additive composition according to claim 1, characterized in that the additive product or additive composition is present in a quantity ranging from 0.01% to 80% by weight with respect to the total weight of the organic polymer containing said additive.

5. A composition comprising an organic polymer and the additive composition according to claim 1, characterized in that the hydrocarbon is present in a quantity ranging from 0.01% to 50% by weight with respect to the total weight of the organic polymer and said additive composition, and the polysiloxane polymer is present in a quantity ranging from 0.05% to 30% by weight with respect to the weight of the organic polymer and said additive composition.

6. A composition containing a thermoplastic organic polymer and the additive composition according to claim 1, wherein the additive product or composition is present in a quantity ranging from 0.01% to 10% by weight with respect to the total weight of the organic polymer containing said additive.

7. A composition containing the additive composition according to claim 1, combined with at least one member selected from the group consisting of additional additives, modifiers, fillers and loadings for organic polymers.

8. A composition containing an organic polymer and the additive composition containing the polysiloxane according to claim 1, wherein the polysiloxane polymer is present in a quantity ranging from 0.05% to 30% by weight with respect to the weight of the polymer containing the additive.

9. The composition containing the additive according to claim 1, characterized in that the additive composition containing the polysiloxane is present in a quantity ranging from 0.01% to 10% by weight with respect to the total weight of the organic polymer containing said additive, when the polymer is a thermoplastic.

10. The composition containing the additive according to claim 1, characterized in that the organic polymer is at least one polymer selected from the group consisting of copolyesters (PET, PBT, PEN) and their copolymers, polyesters, polycarbonates, polyurethanes, polyacetals, polyamides, copolyamides, polyphenyleneoxides, polyimides, polyamide-imides, polysulfones, polyketones, high-strength polyamide compositions, transparent ABS, styrene resins, polymethacrylates and polyetherimides.

11. The composition containing the additive according to claim 10, characterized in that the organic polymer is at least one polymer selected from the group consisting of polycarbonates, polyesters, polyamides, copolyamides, high-strength polyamide compositions, transparent ABS, styrene copolymers, and polymethacrylates.

12. The composition containing the additive according to claim 1, characterized in that the additive composition consists of 2,6,10,15,19,23 hexamethyltetracosane and the organic polymer is at least one polymer selected from the group consisting of polycarbonates, polyesters, copolyamides, transparent ABS, styrene copolymers and polymethacrylates.

13. A formulation which is a paste, liquid, absorbing product or matrix resin containing the additive composition of any one of claims 1, 2–5 and 6 or a matrix upon which is supported the additive composition of any one of claims 1, 2–5 and 6.

14. The method according to claim 1, characterized in that the hydrocarbon is at least one selected from the group consisting of 2,6,10,15,19,23-hexamethyltetracosane and its isomers having hexamethyltetracosane as basic structure.

15. The method according to claim 14, characterized in that the hydrocarbon is 2,6,10,15,19,23-hexamethyltetracosane.

16. The method according to claim 15, characterized in that the organic polymer is at least one selected from the group consisting of polycarbonates, polyesters, copolyamides, transparent ABS, styrene copolymers, and polymethacrylates.

17. A polymeric composition comprising an organic polymer and a lubricating/detaching/fluidifying additive composition for organic polymers, comprising 0.01 to 10% by weight of a saturated hydrocarbon having from 25 to 35 carbon atoms with at least three side substituents consisting of a methyl group with respect to the total weight of the organic polymers wherein the organic polymer is at least one selected from the group consisting of copolyesters, polyesters, polycarbonates, polyurethanes, polyacetals, polyamides, copolyamides, polyphenyleneoxides, polyimides, polyamide-imides, polysulfones, polyketones, high-strength polyamide compositions, polymethacrylates and polyetherimides.

18. The polymeric composition of claim 17 wherein the additive composition further comprises at least one polysiloxane polymer having a number average molecular weight higher than 500,000, and the polymeric composition contains 0.01 to 10% by weight of the additive composition.

19. The polymeric composition according to claim 17 wherein the organic polymer is a polyamide or copolyamide.

20. The polymeric composition according to claim 17 wherein the organic polymer is a polyester.

21. A solution comprising the additive composition of claim 1.

22. A combination which is an absorbing product upon which is supported the additive composition of claim 1 or a matrix resin for a master batch upon which is supported the additive composition of claim 1.

* * * * *

UNITED STATES PATENT AND TRADEMARK OFFICE
CERTIFICATE OF CORRECTION

| | | |
|---|---|---|
| PATENT NO. | : 7,160,938 B1 | Page 1 of 1 |
| APPLICATION NO. | : 09/685601 | |
| DATED | : January 9, 2007 | |
| INVENTOR(S) | : Lo Giudice et al. | |

It is certified that error appears in the above-identified patent and that said Letters Patent is hereby corrected as shown below:

On the title page, Item (30), the Foreign Priority Data information was omitted. Item (30) should read:
-- (30) Foreign Application Priority Data
Oct. 12, 1999     (IT)......................... MI99A 002124 --

Signed and Sealed this

Twenty-fourth Day of April, 2007

JON W. DUDAS
*Director of the United States Patent and Trademark Office*